United States Patent
Yang

(10) Patent No.: US 12,358,159 B2
(45) Date of Patent: Jul. 15, 2025

(54) MODULE-UNIT-POSITION SERVO SYSTEM AND A CONTROL METHOD THEREFOR, AND A MODULAR ROBOT

(71) Applicant: BEIJING KE YI TECHNOLOGY CO., LTD., Beijing (CN)

(72) Inventor: Jianbo Yang, Beijing (CN)

(73) Assignee: BEIJING KE YI TECHNOLOGY CO., LTD., Beijing (CN)

( * ) Notice: Subject to any disclaimer, the term of this patent is extended or adjusted under 35 U.S.C. 154(b) by 371 days.

(21) Appl. No.: 17/900,882

(22) Filed: Sep. 1, 2022

(65) Prior Publication Data

US 2022/0410405 A1 Dec. 29, 2022

Related U.S. Application Data

(63) Continuation of application No. PCT/CN2020/106303, filed on Jul. 31, 2020.

(30) Foreign Application Priority Data

Jan. 7, 2020 (CN) .......................... 202010017093.4
Jan. 7, 2020 (CN) .......................... 202020031987.4

(51) Int. Cl.
*B25J 13/08* (2006.01)
*B25J 9/00* (2006.01)
*B25J 9/08* (2006.01)

(52) U.S. Cl.
CPC ........... *B25J 13/088* (2013.01); *B25J 9/0009* (2013.01); *B25J 9/08* (2013.01)

(58) Field of Classification Search
CPC ........... B25J 13/088; B25J 9/0009; B25J 9/08
See application file for complete search history.

(56) References Cited

U.S. PATENT DOCUMENTS

| 6,686,717 B2 | 2/2004 | Khairallah |
| 2016/0005331 A1 | 1/2016 | Ryland |
| 2018/0311592 A1 | 11/2018 | Wang et al. |

FOREIGN PATENT DOCUMENTS

| CN | 102672727 A | 9/2012 |
| CN | 108274458 A | 7/2018 |

(Continued)

OTHER PUBLICATIONS

Morten Jorgensen, Esben Ostergaard, and Henrik Lund; Modular ATRON: Modules for a self-reconfigurable robot, IEEE, 2004 (Year: 2004).*

(Continued)

*Primary Examiner* — Thomas E Worden
*Assistant Examiner* — Atticus A Cameron
(74) *Attorney, Agent, or Firm* — Workman Nydegger

(57) ABSTRACT

The present disclosure relates to the technical field of electronic products, more particularly to a module-unit-position servo system for detecting the position change between two rotating portions in a module unit of a modular robot; the module unit includes a position sensor disposed in any of the rotating portions and a pair of circumferentially rotatable motion pairs for connecting the two rotating portions; the position sensor senses the rotation-angle information between the motion pairs and controls at least one of the rotating portions to rotate according to the rotation-angle information in combination with a target-angle command A control method for the modular-unit-position servo system and a modular robot is further provided. The module-unit-position servo system and the control method therefor, and the modular robot of the present disclosure have the advantages of compact design, high accuracy in measuring speed and angle.

6 Claims, 11 Drawing Sheets

(56) References Cited

FOREIGN PATENT DOCUMENTS

| | | |
|---|---|---|
| CN | 108326841 A | 7/2018 |
| CN | 208451644 U | 2/2019 |
| CN | 110154013 A | 8/2019 |
| CN | 111216103 A | 6/2020 |
| JP | H06-190774 A | 7/1994 |
| JP | 200379961 A | 3/2003 |
| KR | 101286423 B1 | 7/2013 |
| KR | 102057236 B1 * | 12/2019 |
| WO | 2019120148 A1 | 6/2019 |

OTHER PUBLICATIONS

English Translation of KR-102057236-B1 (wherein the paragraph numbers provided in this translation coincide with the citations provided in the accompanying Office action) (Year: 2019).*

* cited by examiner

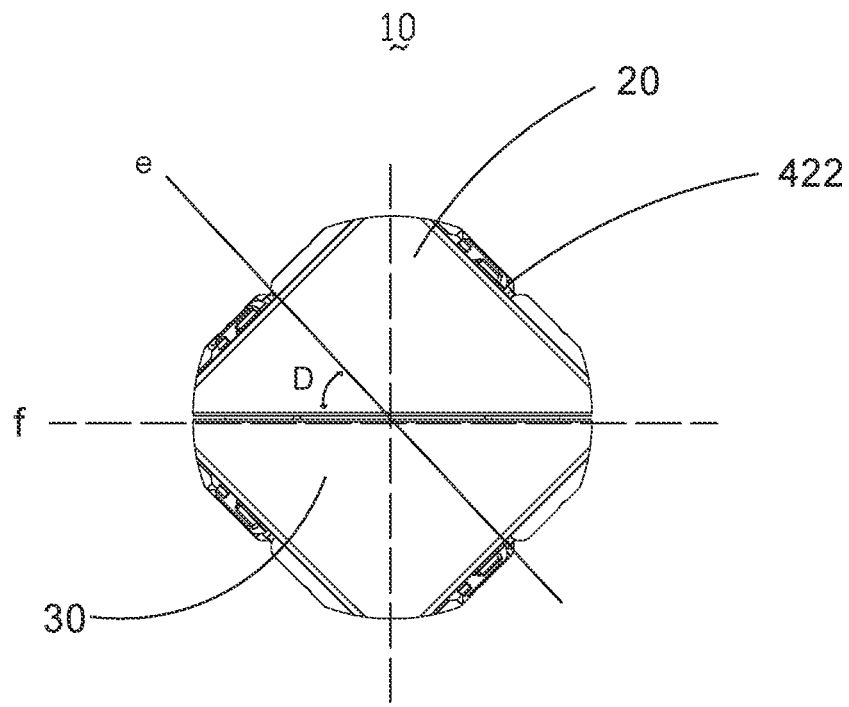
FIG. 2-A
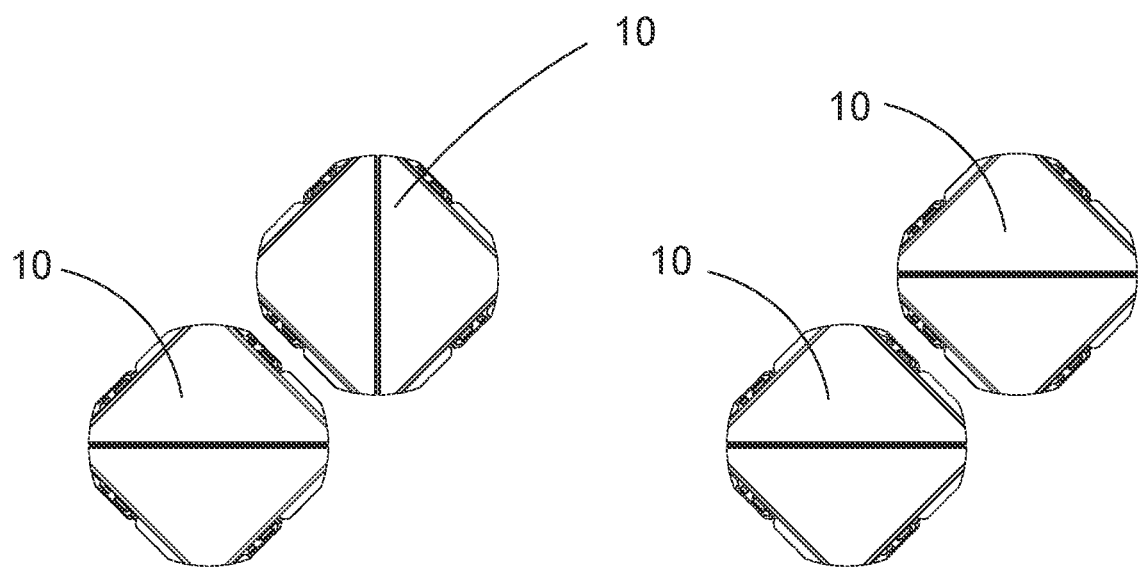
FIG. 2-B
FIG. 2-C

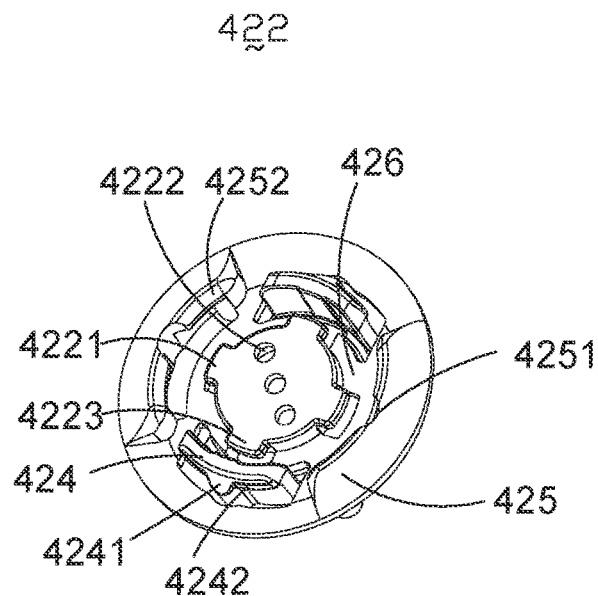
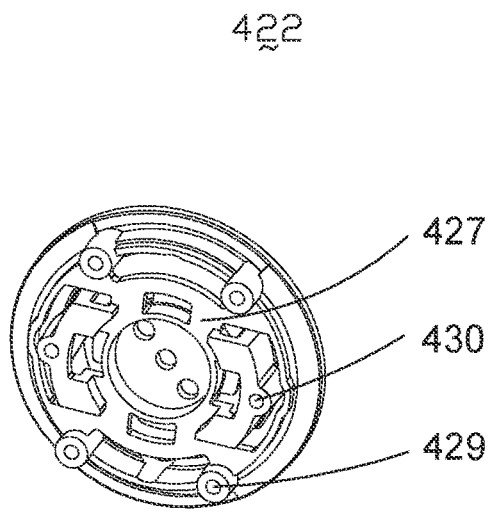
FIG. 7-A
FIG. 7-B
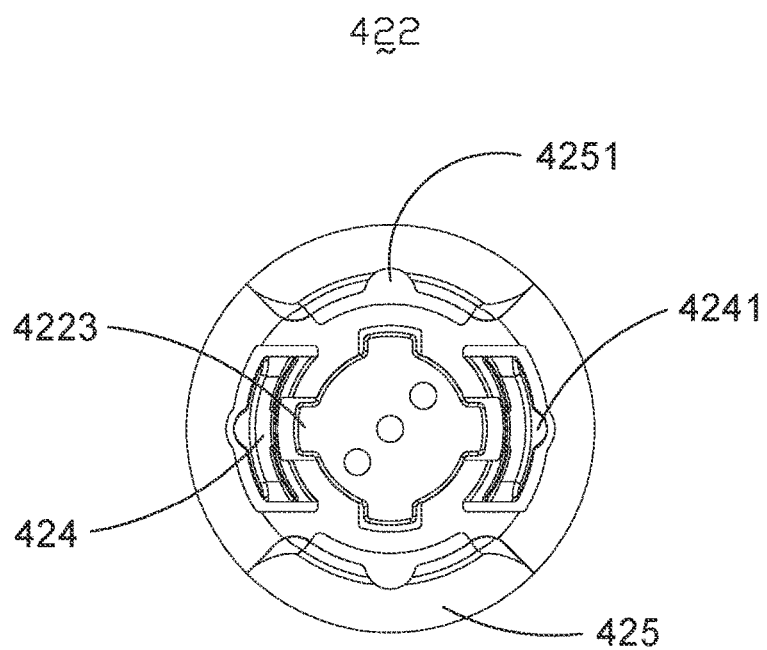
FIG. 8

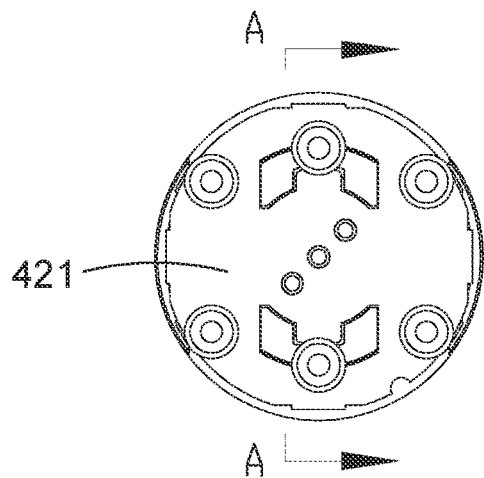 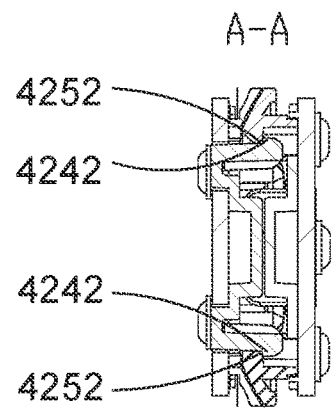
FIG. 9-A　　　　　　FIG. 9-B
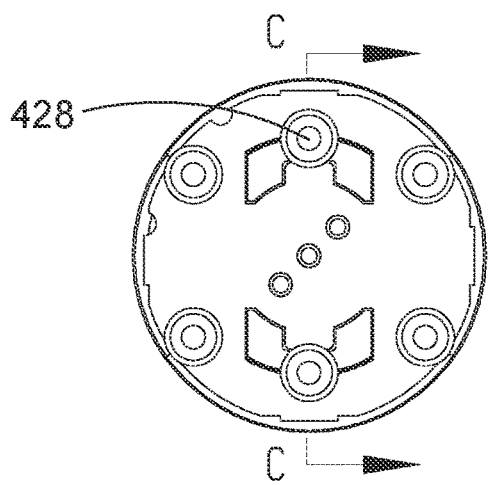 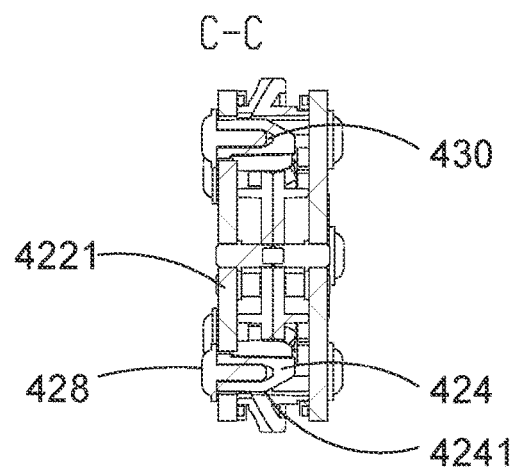
FIG. 10-A　　　　　　FIG. 10-B

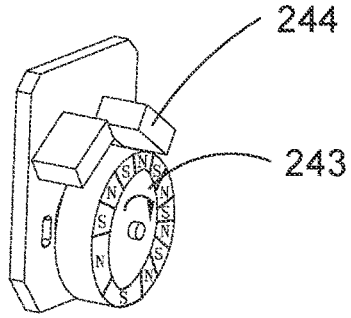
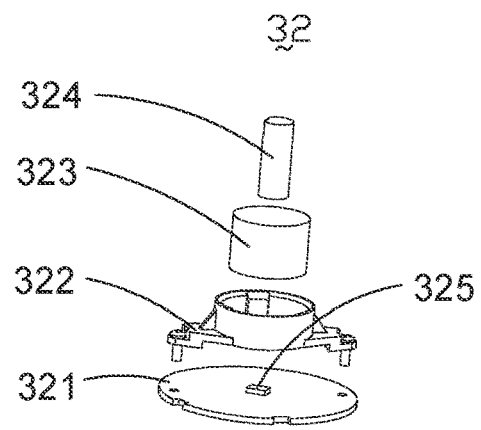
FIG. 13　　　　　FIG. 14
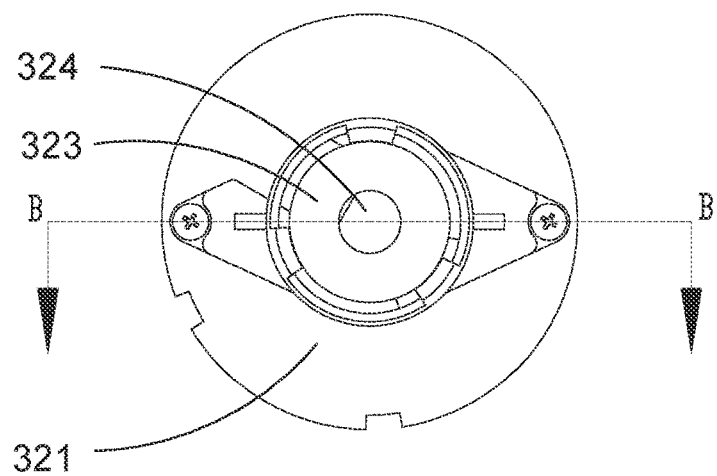
FIG. 15
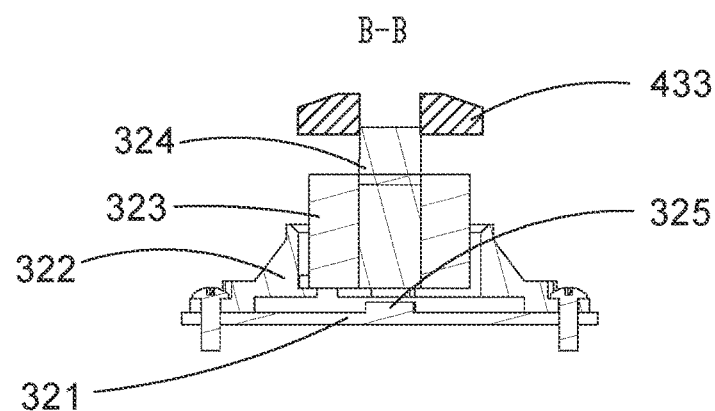
FIG. 16

MODULE-UNIT-POSITION SERVO SYSTEM AND A CONTROL METHOD THEREFOR, AND A MODULAR ROBOT

TECHNICAL FIELD

The present disclosure relates to the technical field of electronic products, and more particularly to a module-unit-position servo system and a control method therefor, and a modular robot.

BACKGROUND

The relative movement between mechanical structures is usually realized by a transmission structure, such as the relative rotation between two hemispheres of a spherical structure. The existing module unit measures the relative rotation angle of the two hemispheres by arranging a single magnetic encoder penetrating through two hemispheres, however, the arrangement of the magnetic encoder easily causes the module unit to be too large.

SUMMARY

In order to overcome the defect of large module-unit volume when the existing module units are spliced, the present disclosure provides a module-unit-position servo system and a control method therefor, and a modular robot.

In order to solve the above technical problems, the present disclosure provides a module-unit-position servo system for detecting the position change between two rotating portions in a module unit of a modular robot; the module unit includes a position sensor disposed in any of the rotating portions and a pair of circumferentially rotatable motion pairs for connecting the two rotating portions; the position sensor senses the rotation-angle information between the motion pairs and controls at least one of the rotating portions to rotate according to the rotation-angle information in combination with a target-angle command.

Compared with the prior art, the module-unit-position servo system and the control method therefor, and the modular robot of the present disclosure have the following beneficial effects.

The present disclosure provides a module-unit-position servo system for detecting the position change between two rotating portions in a module unit of a modular robot; the module unit includes a position sensor disposed in any of the rotating portions and a pair of circumferentially rotatable motion pairs for connecting the two rotating portions; the position sensor senses the rotation-angle information between the motion pairs and controls at least one of the rotating portions to rotate according to the rotation-angle information in combination with a target-angle command By sensing the rotation-angle information between the motion pairs by the position sensor arranged in any of the rotating portions, the angle (position) information between the two rotating portions can be obtained, so that the relative position thereof can be accurately controlled. In addition, the coupling of the position sensor and the motion pairs can reduce the volume of the module unit and make the design compact.

BRIEF DESCRIPTION OF THE DRAWINGS

FIG. 2-A is a front view of a module unit according to the first embodiment of the present disclosure;

FIG. 2-B is a schematic diagram of the connection of two module units according to the first embodiment of the present disclosure;

FIG. 2-C is another schematic diagram of the connection of two module units according to the first embodiment of the present disclosure;

FIG. 7-A is a perspective view of a buckle-connecting member according to the first embodiment of the present disclosure;

FIG. 7-B is another perspective view of the buckle-connecting member according to the first embodiment of the present disclosure;

FIG. 8 is a front view of the buckle-connecting member according to the first embodiment of the present disclosure;

FIG. 9-A is a rear view of the connection of two buckle-connecting members according to the first embodiment of the present disclosure;

FIG. 9-B is a cross-sectional view of FIG. 9-A along the A-A direction;

FIG. 10-A is a rear view of the connection of two buckle-connecting members according to the first embodiment of the present disclosure;

FIG. 10-B is a cross-sectional view of FIG. 9-A along the C-C direction;

FIG. 13 is a perspective view of a magnetic member according to the first embodiment of the present disclosure;

FIG. 14 is an exploded view of a connecting assembly according to the first embodiment of the present disclosure;

FIG. 15 is a top view of the connecting assembly according to the first embodiment of the present disclosure;

FIG. 16 is a cross-sectional view of FIG. 15 along the B-B direction;

Figure 1:
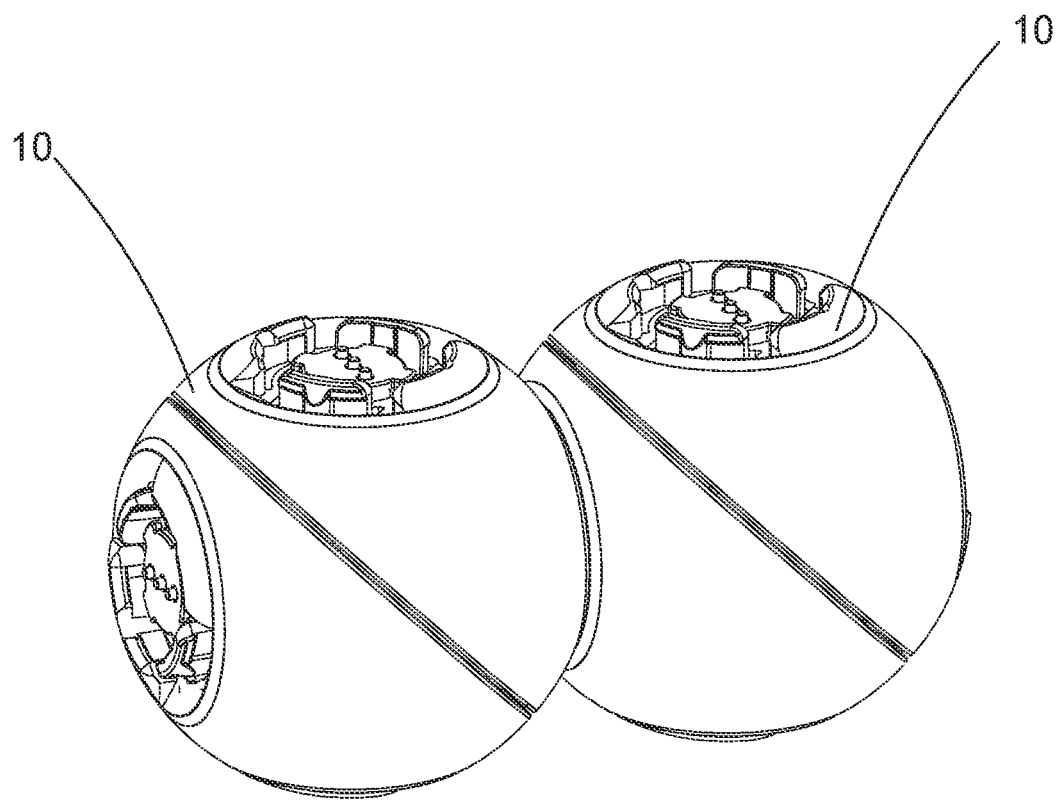
FIG. 1 is a perspective view of a modular robot according to a first embodiment of the present disclosure.

NUMERICAL REFERENCE IDENTIFICATION 01, modular robot; 10, module unit; 20, first rotating portion; 22, transmission assembly; 23, protective cover; 24, transmission member; 241, drive motor; 242, bevel gear; 243, magnetic member; 244, speed sensor; 245, mounting plate; 25, rotating assembly; 251, connecting plate; 252, gear ring; 253, mounting frame; 254, rotating frame; 255, ball; 30, second rotating portion; 32, connecting assembly; 321, second PCB board; 322, conductive ring seat; 323, slip ring; 324, magnet; 325, position sensor; 40, first rotating member; 41, housing; 411, first penetrating hole; 42, surface buckle; 421, first PCB board; 4211, LED; 4212, second electrical-connecting member; 4213, middle through-hole; 422, buckle-connecting member; 4221, first connecting block; 4222, first accommodating hole; 4223, first protrusion; 423, shielding member; 424, first buckling block; 4241, connecting protrusion; 4242, first clamping block; 425, second buckling block; 4251, groove; 4252, second clamping block; 426, buckle-connecting surface; 427, buckle-mounting surface; 428, fastener; 429, side hole; 430, buckle-connecting hole; 43, connecting member; 431, second penetrating hole; 432, accommodating member; 4321, accommodating groove; 433, abutting member; 50, second rotating member; 100, buckling assembly; 101, first buckling portion; 102, second buckling portion; 103, rotation-connecting portion; 104, connecting housing; 105, fixed core; 106, rotating hole; 107, second accommodating hole; 108, latching slot; 109, position-limiting protrusion; 110, second connecting block; 111, first electrical-connecting member; 112, locking member; 113, accommodating hole; 114, rotation-limiting hole; 1141, accommodating end; 1142, clamping end; 115, clamping plate; 116, third clamping block; 117, buckling member; 118, latching position; 119, recessed hole; 120, accommodating space; 130, clamping member; 141, first connecting shaft; 142, second connecting shaft; 200, modular-unit-position servo system; 201, rotating portion; 202, position sensor; 203, magnet; 204, controller; 210, motion pair; 211, transmission assembly; 212, connecting assembly.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that, when an element is referred to as being "fixed to" another element, it can be directly on the other element or intervening elements may also exist. When an element is referred to as being "connected" to another element, it can be directly connected to the other element or intervening elements may also exist. The terms "vertical", "horizontal", "left", "right" and similar expressions are used herein for illustrative purposes only.

Referring to FIG. 1 and FIG. 2-A, the present disclosure provides a modular robot 01, which includes at least one module unit 10, and any two of the module units 10 can be directly or indirectly connected to form a motion mechanism. The modular robot 01 with different configurations can be reconfigured by different connection modes of the module units 10. The module unit 10 includes a first rotating portion 20, a second rotating portion 30 rotatably connected to the first rotating portion 20, and a control portion (not shown) that can drive at least one of the first rotating portion 20 and the second rotating portion 30 to rotate. The first rotating portion 20 and the second rotating portion 30 can be relatively rotatable to realize different motion states of the modular robot 01. The module unit 10 is spherical, and the first rotating portion 20 and the second rotating portion 30 are hemispherical. The rotating portion can be any one of the first rotating portion 20 or the second rotating portion 30. The control portion includes a controller and at least two sensors, the sensors are used to sense the relative position, speed and torque of the first rotating portion 20 and the second rotating portion 30, and the controller is used to control the position, speed and torque thereof.

Figure 3:
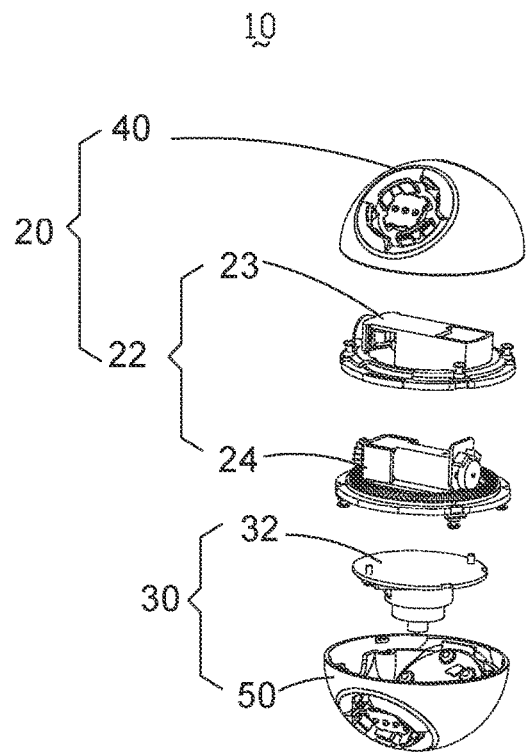
FIG. 3 is an exploded view of the module unit according to the first embodiment of the present disclosure.

Referring to FIG. 3, the first rotating portion 20 includes a first rotating member 40 of a hemispherical structure, and a transmission assembly 22 accommodated in the first rotating member 40. The second rotating portion 30 includes a second rotating member 50, and a connecting assembly 32 accommodated in the second rotating member 50. The first rotating member 40 has the same structure as the second rotating member 50. The transmission assembly 22 is connected to the connecting assembly 32, and the first rotating member 40 is connected to the second rotating member 50 to form an accommodating space for accommodating the transmission assembly 22 and the connecting assembly 32.

Figure 4:
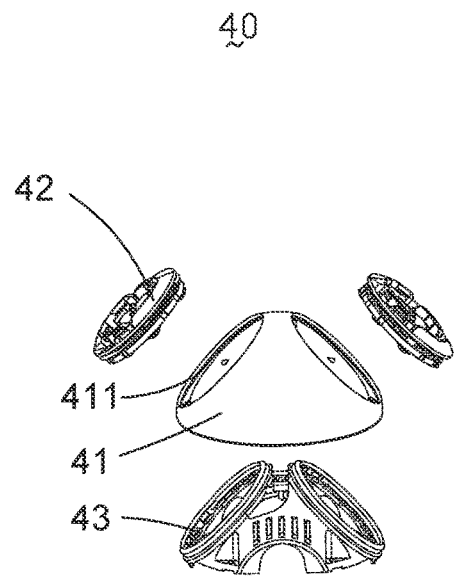
FIG. 4 is an exploded view of a first rotating member according to the first embodiment of the present disclosure.
Figure 5:
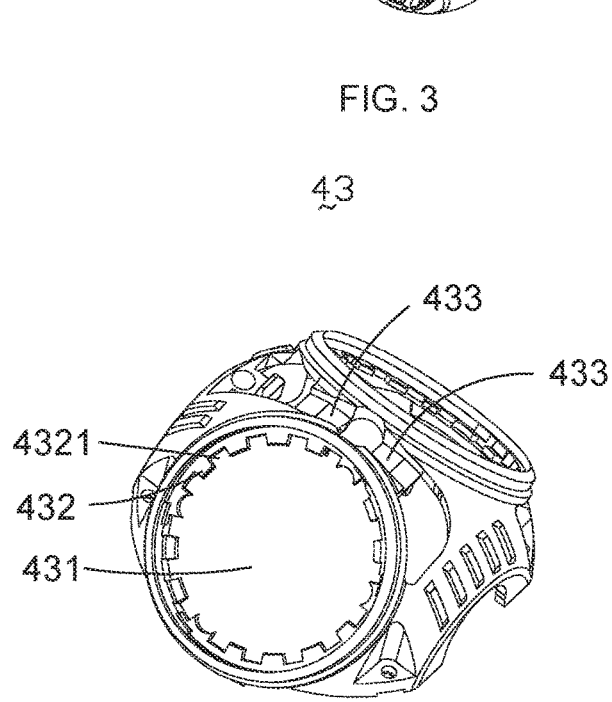
FIG. 5 is a perspective view of a connecting member according to the first embodiment of the present disclosure.

Referring to FIG. 4 and FIG. 5, the first rotating member 40 includes a hollow housing 41, a connecting member 43 accommodated in the housing 41, and at least one surface buckle 42 connected to the connecting member 43. The housing 41 is a hemispherical structure, and the housing 41 defines a first penetrating hole 411 for the surface buckle 42 to pass through. The number of the first penetrating hole 411 is equal to that of the surface buckle 42. The surface buckle 42 passes through the first penetrating hole 411 and is connected to the connecting member 43.

The shape and structure of the connecting member 43 correspond to that of the housing 41. A second penetrating hole 431 is defined at the position of the connecting member 43 with respect to the first penetrating hole 411. The surface buckle 42 passes through the first penetrating hole 411 and the second penetrating hole 431 sequentially. The inner wall of the second penetrating hole 431 extends to form an annular accommodating member 432 that defines a plurality of accommodating grooves 4321 annularly distributed and connected to the surface buckle 42.

An abutting member 433 formed by protruding toward the connecting assembly 32 is disposed between the two second penetrating holes 431. When the connecting assembly 32 is accommodated in the connecting member 43, the abutting member 433 is resistively connected to the connecting assembly 32.

Figure 6:
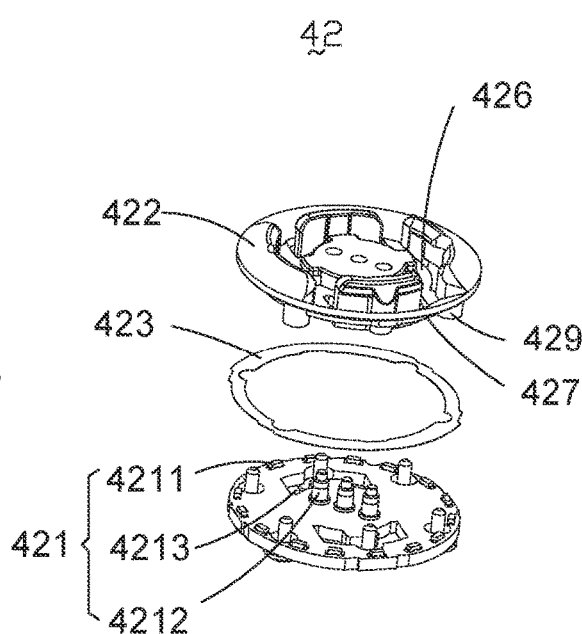
FIG. 6 is an exploded view of a surface buckle according to the first embodiment of the present disclosure.

Referring to FIG. 6, the surface buckle 42 includes a buckle-connecting surface 426, a buckle-mounting surface 427 opposite to the buckle-connecting surface 426, a first PCB board 421 connected to the accommodating groove 4321, a buckle-connecting member 422 connected to the first PCB board 421, and a shielding member 423 sleeved between the buckle-connecting member 422 and the first PCB board 421. The buckle-connecting member 422 is connected to another buckle-connecting member 422. One end of the first PCB board 421 is detachably connected to the buckle-connecting member 422, and the other end thereof is electrically connected to the connecting assembly 32. A plurality of LEDs 4211 is annularly disposed on the side of the first PCB board 421 facing the buckle-connecting member 422. When the surface buckle 42 is connected to the connecting member 43, the plurality of LEDs 4211 is accordingly accommodated in the accommodating grooves 4321. The plurality of LEDs 4211 provides light source display for the module unit 10 to visually display the working status of the module unit 10 to the user in real time. The shielding member 423 is a hollow structure for the buckle-connecting member 422 and the first PCB board 421 to pass through, and the shielding member 423 is positioned on the LEDs 4211 to prevent light leakage from the LEDs 4211.

At least two side holes 429 are defined on the edge of the buckle-mounting surface 427, and the first PCB board 421 and the buckle-mounting surface 427 are fixed by fasteners through the side holes 429. At least two second electrical-connecting members 4212 are disposed at the center of the first PCB board 421, one end of the second electrical-connecting members 4212 is penetrated through the first PCB board 421 and the shielding member 423 sequentially and is connected to the buckle-connecting member 422, and the other end thereof is electrically connected to the connecting assembly 32. The second electrical-connecting member 4212 is used for signal transmission for a plurality of spliced module units 10, that is, signal communication can be realized by contacting the second electrical-connecting member 4212 with the corresponding electrical-connecting member of an external module. The second electrical-connecting member 4212 is a copper column for conductive transmission, in this embodiment, the second electrical-connecting member 4212 is an electrical-connecting member. The first PCB board 421 further defines two middle through-holes 4213 corresponding to the buckle-connecting member 422, and fasteners (not marked) can pass through the middle through-holes 4213 to realize the connection between the first PCB board 421 and the buckle-connecting member 422. By adjusting the fasteners, the tightness degree of the connection between the first PCB board 421 and the buckle-connecting member 422 can be adjusted, and the buckling strength between the two buckle-connecting members 422 can also be adjusted. In this embodiment, the number of the second electrical-connecting members 4212 is three.

Referring to FIG. 6, FIG. 7-A and FIG. 7-B, a cylindrical first connecting block 4221 is formed by extending the center of the buckle-connecting member 422 toward the side away from the first PCB board 421. The first connecting block 4221 defines at least two first accommodating holes 4222 for accommodating the second electrical-connecting members 4212, and the number of the first accommodating holes 4222 corresponds the second electrical-connecting members 4212. The second electrical-connecting members 4212 are exposed to the buckle-connecting surface 426 through the first accommodating holes 4222. The outer wall of the first connecting block 4221 extends along the "cross" direction to form four first protrusions 4223, and a gap is left between the first protrusions 4223 and the buckle-connecting member 422 to form a space. Preferably, the number of the first accommodating holes 4222 is three.

Referring to FIG. 7-A, FIG. 7-B and FIG. 8, a first buckling block 424 and a second buckling block 425 are respectively disposed on two opposite sides of the buckle-connecting member 422 corresponding to the extending direction of the first protrusion 4223. The first buckling block 424, the second buckling block 425 and the first connecting block 4221 are formed on the buckle-connecting surface 426, and the first buckling block 424 and the second buckling block 425 are disposed around the first connecting block 4221. The first buckling block 424 and the second buckling block 425 can be deformed to a certain extent after being stressed, and the middle through-hole 4213 corresponds to the first buckling block 424 accommodated in the middle through-hole 4213. The first buckling block 424 and the second buckling block 425 extend in the direction away from the first PCB board 421 respectively, and space is respectively left between the first buckling block 424 and the first protrusion 4223, and between the second buckling block 425 and the first protrusion 4223. A connecting protrusion 4241 is formed by extending the first buckling block 424 along the side thereof away from the first connecting block 4221, and a side of the second buckling block 425 close to the first connecting block 4221 is recessed to form a groove 4251. The connecting protrusion 4241 corresponds to the groove 4251 and both are arc-shaped, and the connecting lines of the opposite connecting protrusions 4241 and the opposite grooves 4251 are in a "cross" shape. When the two module units 10 are connected, the first buckling block 424 and the second buckling block 425 are matched and connected correspondingly, and the connecting protrusion 4241 abuts against the groove 4251. A plane is defined between the first connecting block 4221, the first buckling block 424 and the second buckling block 425, and a gap is formed between the first protrusion 4223 and the plane for insertion of a buckling assembly (not shown) of a peripheral device.

Two buckle-connecting holes 430 corresponding to the first buckling blocks 424 are disposed on the buckle-mounting surface 427. The buckle-connecting holes 430 are correspondingly disposed at the positions of the connecting protrusions 4241, and the buckle-connecting holes 430 extend into the first buckling block 424. Fasteners can be driven into the buckle-connecting holes 430, and the buckling force between the two surface buckles 42 can be controlled according to the depth of the fasteners driven into the buckle-connecting holes 430.

Referring to FIG. 7-A again, the side of the first buckling block 424 away from the first connecting block 4221 protrudes to form a first clamping block 4242, and the side of the second buckling block 425 close to the first connecting block 4221 is recessed to form a second clamping block 4252. The first clamping block 4242 and the second clamping block 4252 are disposed on a side away from the first PCB board. The first clamping block 4242 and the second clamping block 4252 respectively form a "T" shape with the connecting protrusion 4241 and the groove 4251, and the first clamping block 4242 and the second clamping block 4252 are configured in an arc shape. Referring to FIG. 8, FIG. 9-A and FIG. 9-B, taking the cooperation and connection of the two buckle-connecting members as an example, when the connecting protrusion 4241 abuts against the corresponding groove 4251, the first clamping block 4242 is in elastic contact with the second clamping block 4252 to realize the cooperation and connection between the two module units 10.

Referring to FIG. 10-A and FIG. 10-B and in conjunction with FIG. 7-A and FIG. 7-B, the fastener 428 passes through the middle through-hole 4213 and the buckle-connecting hole 430 to realize the connection between the first PCB board 421 and the buckle-connecting member 422, and the fastener 428 passes through the middle through-hole 4213 and accommodated in the buckle-connecting hole 430. During the buckling process of the surface buckle 42, the fastener 428 driven into the first buckling block 424 is deformed to the first connecting block 4221 so that the first clamping block 4242 and the second clamping block 4252 are clamped. When the two surface buckles 42 are separated, due to the matching arc surfaces between the first clamping block 4242 and the second clamping block 4252, the fastener 428 driven into the first buckling block 424 is again deformed to the side away from the first connecting block 4221. When the driven fastener 428 is tight, the first buckling block 424 is hard to deform, and the two surface buckles 42 are hard to separate; when the driven fastener 428 is loose, the first buckling block 424 is easily deformed, and the two surface buckles 42 are easily separated in this case. Thus, the surface buckles 42 connected to each other are easy to install and connect, and hard to disassemble, so that the effect of easy installation and hard disassembly of the surface buckles 42 is achieved. When the module units 10 are spliced together, the second electrical-connecting members 4212 between the module units 10 are in contact with each other to realize signal transmission therebetween.

Figure 11:
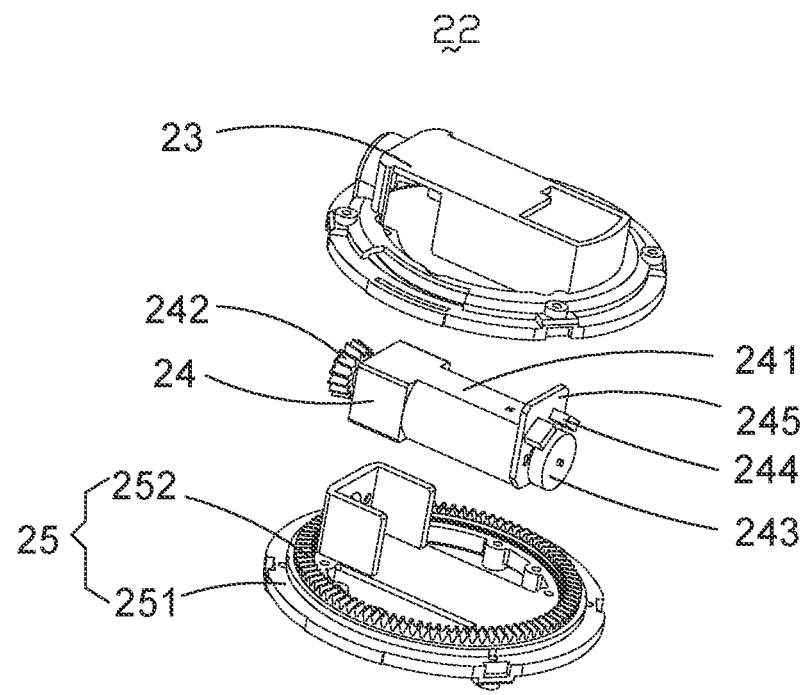
FIG. 11 is an exploded view of a transmission assembly according to the first embodiment of the present disclosure.

Referring to FIG. 11, the transmission assembly 22 includes a transmission member 24, a rotating assembly 25, and a protective cover 23 connected to the rotating assembly 25. The protective cover 23 is connected to the connecting member 43 of the first rotating member 40. The rotating assembly 25 is connected to the protective cover 23 to form an accommodating space for accommodating the transmission member 24. The protective cover 23 corresponds to the transmission member 24. When the protective cover 23 is connected to the transmission member 24, the transmission member 24 is accommodated in the protective cover 23.

Referring to FIG. 11 again, the transmission member 24 further includes a drive motor 241, a bevel gear 242 coaxially connected to one end of the drive motor 241, and a cylindrical magnetic member 243 coaxially connected to the other end of the drive motor 241. The bevel gear 242 is rotatably connected to the rotating assembly 25 and the bevel gear 242 drives the rotating assembly 25 to rotate. That is, the servo device further includes a drive motor 241 disposed between any of the rotating portions.

The transmission member 24 further includes a mounting plate 245, and at least one speed sensor 244 connected to the mounting plate 245. As shown in FIG. 11, the mounting plate 245 is fixedly connected to one end of the drive motor 241, the speed sensor 244 is disposed in the circumferential direction of the magnetic member 243, and the speed sensor 244 is electrically connected to the connecting assembly 32 (as shown in FIG. 3). In some specific embodiments, the speed sensor 244 is a Hall sensor and the number thereof is two, the two speed sensors 244 are opposite to the magnetic member 243 and are inclined at a certain angle, and the inclination angle between the two speed sensors 244 is 100°-120°; and/or the distance between the speed sensor 244 and the magnetic member 243 is 1-2 mm. The speed sensor 244 can calculate the rotation speed of the drive motor 241 and determine the forward and reverse rotation of the drive motor 241 according to the change of the magnetic pole of the magnetic member 243. Preferably, the inclination angle is 100°-120°. Specifically, the inclination angle may also be 100°, 110°, 115°, etc. In this case, the projection area of the two speed sensors 244 on the magnetic member 243 is the largest, which can more accurately measure the change of the magnetic pole of the magnetic member 243.

Figure 12:
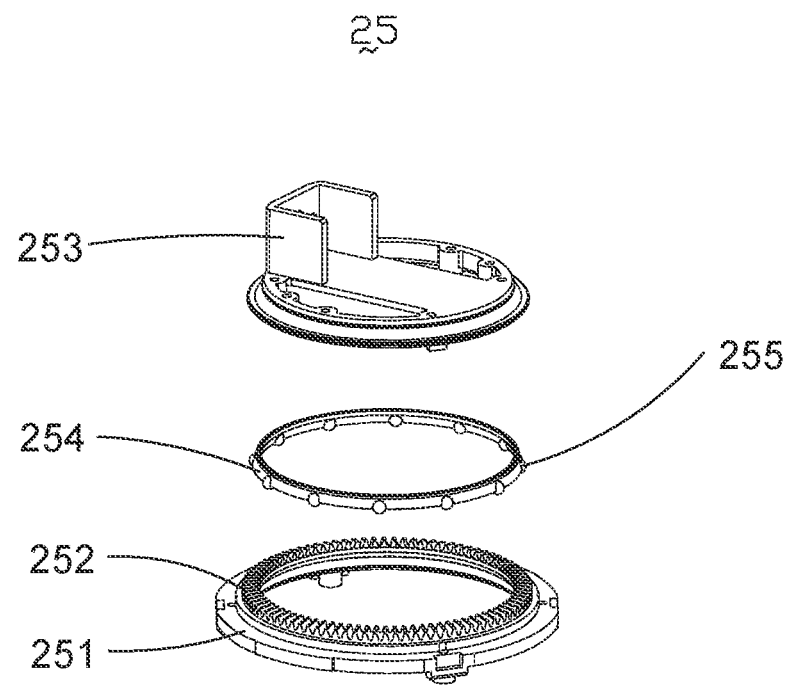
FIG. 12 is an exploded view of a rotating assembly according to the first embodiment of the present disclosure.

Referring to FIG. 12, specifically, in order to enable the bevel gear 242 to better drive the rotating assembly 25 to rotate, in some specific embodiments, the rotating assembly 25 includes a hollow connecting plate 251 and a gear ring 252 fixedly connected to connecting plate 251. The gear ring 252 is disposed on the side of the connecting plate 251 close to the transmission member 24, the ring surface of the gear ring 252 without gears is connected to the connecting plate 251, and the ring surface of the gear ring 252 with gears is rotatably connected to the bevel gear 242. The gear ring 252 is correspondingly matched and connected to the bevel gear 242 to realize the drive motor 241 to drive the rotating assembly 25 to rotate, and the connecting plate 251 is connected to the connecting member 43 on the second rotating member 50.

Referring to FIG. 12 in conjunction with FIG. 11, the rotating assembly 25 further includes a mounting frame 253 fixedly connected to the drive motor 241 and a rotating frame 254 rotatably connected to the mounting frame 253. The mounting frame 253 is connected to the connecting assembly 32, and the mounting frame 253 and the rotating frame 254 are accommodated in the connecting plate 251. The rotating frame 254 has a ring structure. Specifically, a plurality of balls 255 is provided on the rotating frame 254 and distributed in a circle. The rotating frame 254 is sleeved on the mounting frame 253, and the mounting frame 253 is connected to and rotatable with respect to the connecting plate 251 through the balls 255. The protective cover 23 corresponds to and accommodates the drive motor 241, the speed sensor 244, the magnetic member 243 and the mounting frame 253. Thus, the volume of the transmission assembly 22 can be reduced, and the volume of the entire module unit 10 is further reduced, which makes the design compact.

With the above-mentioned design, when the bevel gear 242 and the gear ring 252 rotate with respect to each other, the mounting frame 253, the drive motor 241 and the protective cover 23 rotate with respect to the gear ring 252, and the connecting plate 251. The mounting frame 253 drives the connecting assembly 32 to rotate, and the protective cover 23 drives the first rotating member 40 to rotate, which realizes the relative rotation of the first rotating member 40 and the second rotating member 50.

Referring to FIG. 13, the magnetic member 243 is provided with a plurality of magnetic poles, the magnetic poles include N poles and S poles, which can be arranged at intervals. When the drive motor 241 rotates to drive the magnetic member 243 and the bevel gear 242 to rotate, the bevel gear 242 drives the rotating assembly 25 to rotate. In this case, the speed sensor 244 senses the changes of the plurality of magnetic poles of the magnetic member 243 to calculate the rotation speed of the drive motor 241 and determine the forward and reverse rotation of the drive motor 241.

Referring to FIG. 14, FIG. 15 and FIG. 16, the connecting assembly 32 further includes a second PCB board 321 connected to the mounting frame (not shown), a conductive ring seat 322 connected to the second PCB board 321, and a slip ring 323 partially accommodated in the conductive ring seat 322, and a magnet 324 accommodated in the slip ring 323. The slip ring 323 is sleeved on the periphery of the magnet 324, the magnet 324 abuts against the abutting member 433, and the second PCB board 321 is a controller. The second PCB board 321 is electrically connected to the speed sensor 244 and the drive motor 241 and is provided with a position sensor 325 at the position corresponding to the magnet 324. The position sensor 325 rotates synchronously with the slip ring 323, and the distance between the magnet 324 and the position sensor 325 is 1 mm-2 mm. The first rotating member 40 drives the slip ring 323 and the position sensor 325 to rotate relative to the magnet 324. The position sensor 325 is used to detect the position-change signal of the magnet 324 to obtain the rotation angle of the magnet 324, and by detecting the rotation angle between the magnet 324 and the position sensor 325, the rotation information between the two rotating portions is detected and transmitted to the second PCB board 321. The controller is disposed on the second PCB board 321 and controls the drive motor 241 to operate at a set rotation speed based on the rotation-angle information detected by the position sensor 325 and the target-angle command.

When the first rotating member 40 and the second rotating member 50 need to rotate with respect to each other, the drive motor 241 may first drive the connecting plate 251 to rotate, and then the connecting plate 251 drives the second PCB board 321 fixedly connected to the connecting plate 251 to rotate. Since the conductive ring seat 322 and the slip ring 323 are sequentially fixed on the second PCB board 321, the conductive ring seat 322 and the slip ring 323 will accordingly rotate. That is, by driving the drive motor 241, the first rotating member 40 can be driven to rotate synchronously, and the conductive ring seat 322 drives the slip ring 323 to rotate relative to the magnet 324.

At the same time, since the magnet 324 is connected to the second rotating member 50 and the magnet 324 is connected to the abutting member 433, the magnet 324 and the second rotating member 50 will not rotate with the second PCB board 321.

Therefore, based on the above-mentioned connection structure and linkage relationship, the first rotating member 40 and the second rotating member 50 can be relatively rotated, and through the relative rotation between the position sensor 325 and the magnet 324, the relative rotation angle between the first rotating member 40 and the second rotating member 50 is detected and obtained through the position sensor 325.

Referring to FIG. 2-A again, the module unit 10 includes a first rotating portion 20 and a second rotating portion 30 that can be relatively rotated and have a hemispherical structure. Both the first rotating portion 20 and the second rotating portion 30 rotate along the midperpendicular line f of the hemispherical section. At least one buckle-connecting member 422 is provided on the first rotating portion 20 and the second rotating portion 30, and the positions of the buckle-connecting members 422 on the first rotating portion 20 and the second rotating portion 30 are mirror-symmetrical based on the hemispherical section. That is, the configuration of the positions of the buckle-connecting members 422 of the first rotating portion 20 and the second rotating portion 30 are mirror-symmetrical based on the interface of the first rotating portion 20 and the second rotating portion 30. The module units 10 are plugged and connected through a set of buckle-connecting members 422.

The buckle-connecting member 422 is circular, the vertical line e, which passes through the center of the buckle-connecting member 422 and is perpendicular to the plane where the buckle-connecting member 422 is positioned, intersects with the rotation midperpendicular line f of the rotating portion, and the angle D of intersection thereof is 30°-60°. The number of the buckle-connecting members 422 disposed on the module unit 10 is an even number. Optionally, in some specific embodiments, the angle D is 45°. Referring to FIG. 2-B and FIG. 2-C, in this case, no matter whether the intermediate rotation shafts of the two modular units 10 are parallel or vertical, the two modular units 10 can be spliced together, which reduces the coupling of the freedom degree between the mutually spliced modular units 10.

Figure 17:
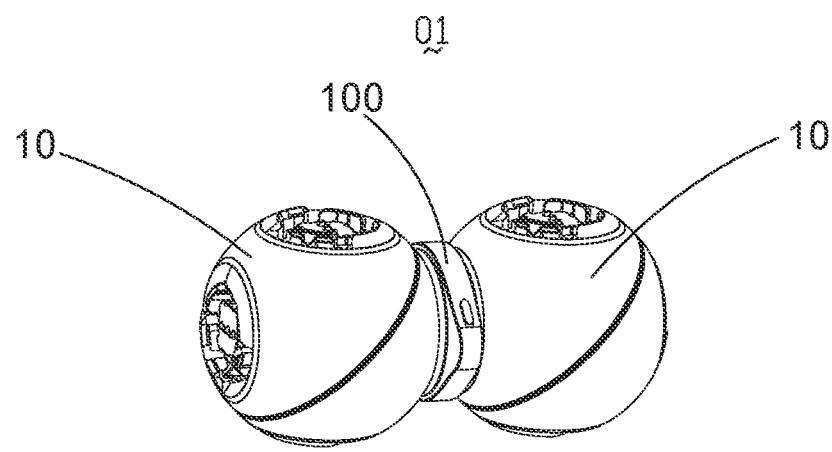
FIG. 17 is a perspective view of a modular robot according to a second embodiment of the present disclosure.

Referring to FIG. 17, a second embodiment of the present disclosure provides a modular robot 01, which includes at least two module units 10 and a buckling assembly 100 for connecting the adjacent modular units 10. Any two of the modular units 10 can be connected by the buckling assembly 100 to form a motion mechanism, and the modular robot 01 of different structures can be assembled by splicing the modular units 10 through different connection modes of the buckling assembly 100.

The buckling assembly 100 includes a rotation-connecting portion 103, a first buckling portion 101 detachably connected to one side of the rotation-connecting portion 103, a second buckling portion 102 detachably connected to the other side of the rotation-connecting portion 103, and at least two first electrical-connecting members 111 respectively penetrating through the first buckling portion 101, the second buckling portion 102 and the rotation-connecting portion 103. The first electrical-connecting member 111 may be any one of electrical-connecting members such as copper pillars, alloy pillars, etc., which perform a conductive transmission function. In this embodiment, the first electrical-connecting member 111 is an electrical-connecting member. The structure of the first buckling portion 101 corresponds to the structure of the second buckling portion 102 in a mirror image. Any one of the buckle-connecting members 422 of the two module units 10 is screwed and fixedly connected to the first buckling portion 101 and the second buckling portion 102 respectively.

The two module units 10 are spliced by the buckling assembly 100, one of the module unit 10 is connected to the first buckling portion 101, and the other module unit 10 is connected to the second buckling portion 102.

Figure 18:
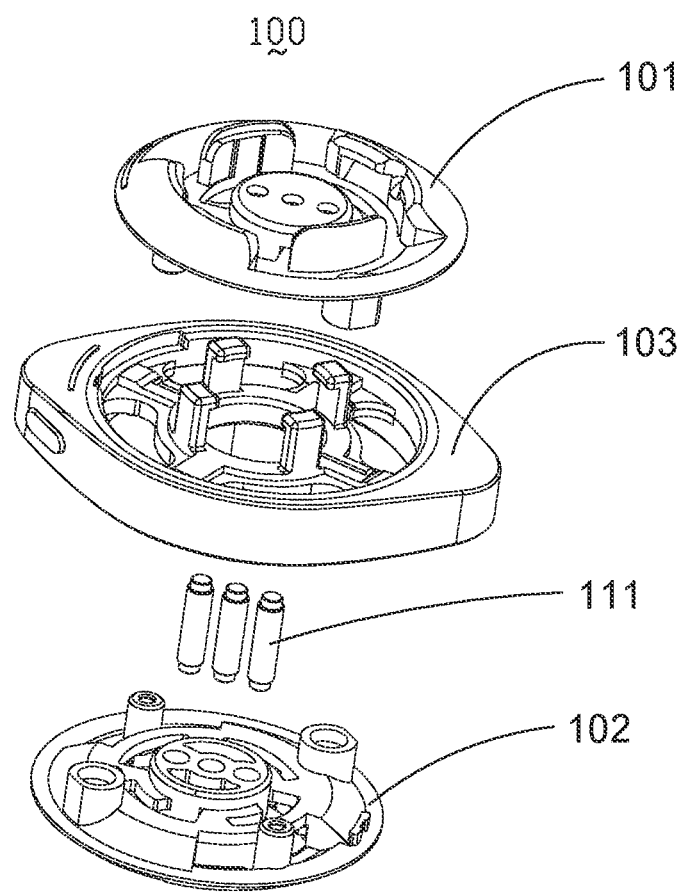
FIG. 18 is an exploded view of the buckling assembly according to the second embodiment of the present disclosure.
Figure 19:
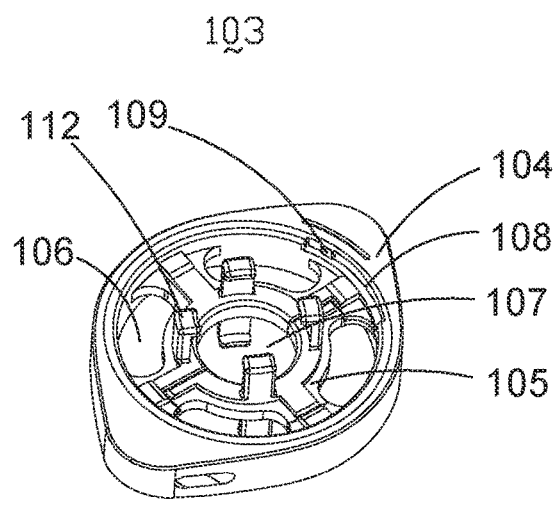
FIG. 19 is a perspective view of a rotation-connecting portion according to the second embodiment of the present disclosure.

Referring to FIG. 18 and FIG. 19, the rotation-connecting portion 103 includes a connecting housing 104 and a fixed core 105 disposed in the connecting housing 104. The fixed core 105 is a disc-shaped structure disposed in the connecting housing 104. The fixed core 105 is recessed toward the sides opposite to the end faces of the first buckling portion 101 and the second buckling portion 102 to form a space for accommodating the first buckling portion 101 and the second buckling portion 102. The outer peripheral walls of the first buckling portion 101 and the second buckling portion 102 are respectively sleeved with the inner wall of the connecting housing 104.

The fixed core 105 defines rotating holes 106 in any two mutually perpendicular diametric directions thereof, which are waist-shaped holes and arranged on the inner wall of the fixed core 105 and the connecting housing 104. A second accommodating hole 107 is defined in the center of the fixed core 105. The second accommodating hole 107 accommodates the first buckling portion 101 and the second buckling portion 102, and the first electrical-connecting member 111 passes through the second accommodating hole 107. In this embodiment, the number of the first electrical-connecting member 111 is three.

Referring to FIG. 19, the fixed core 105 is further provided with at least one locking member 112 of a resilient structure disposed between the rotating hole 106 and the second accommodating hole 107. The locking member 112 extends in the direction of the first buckling portion 101 and the second buckling portion 102, respectively, and the ends of the locking member 112 close to the first buckling portion 101 and the second buckling portion 102 protrude along the central axis of the second accommodating hole 107 to form a hook shape. The locking member 112 is rotatably coupled with the first buckling portion 101 and the second buckling portion 102 to realize the detachable connection therebetween. In this embodiment, the number of the locking members 112 is four, and the locking members 112 are distributed on two mutually perpendicular diameters. The inner wall of the connecting housing 104 facing the first buckling portion 101 and the second buckling portion 102 is further provided with a latching slot 108, and the latching slot 108 is provided with a position-limiting protrusion 109 connected to the first buckling portion 101 and the second buckling portion 102.

Figure 20:
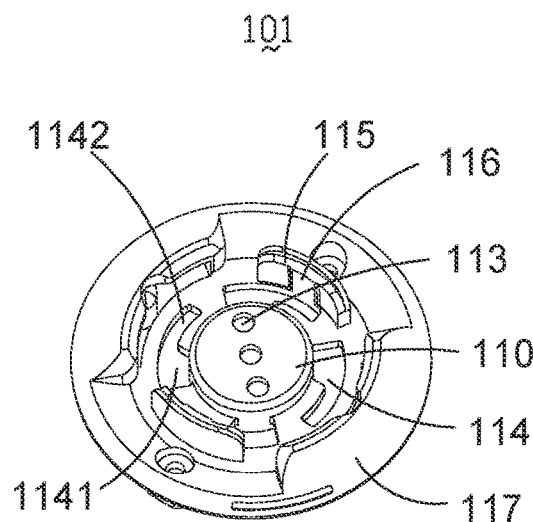
FIG. 20 is a perspective view of a first buckling portion according to the second embodiment of the present disclosure.

Referring to FIG. 20, the center of the first buckling portion 101 respectively extends toward the side close to and away from the rotation-connecting portion 103 to form a columnar second connecting block 110. The second connecting block 110 defines accommodating holes 113 for accommodating the first electrical-connecting members 111, the number thereof corresponds to the number of the first electrical-connecting members 111, and the second electrical connector 111 is exposed from the accommodating hole 113. A rotation-limiting hole 114 is defined on the first buckling portion 101 corresponding to the locking member 112, which defines an accommodating end 1141 and a clamping end 1142 that are connected to each other. The size of the accommodating end is larger than that of the locking member 112 to accommodate the locking member 112, and the size of the clamping end 1142 corresponds to that of the locking member 112. The locking member 112 and the clamping end 1142 are in an interference fit, the locking member 112 is exposed through the rotation-limiting hole 114, and the rotation limiting hole 114 is configured in an arc shape. Referring to FIG. 18, the rotating holes 106 are used for the passage of the second connecting blocks 110 of the first buckling portion 101 and the second buckling portion 102.

Referring to FIG. 20 again, the first buckling portion 101 is further provided with a clamping plate 115 in the diameter direction thereof, the clamping plate 115 is disposed around the second connecting block 110, and extends toward the side away from the rotation-connecting portion 103. The clamping plate 115 is close to the clamping end 1142 of the rotation-limiting hole 114 and protrudes toward the second connecting block 110 to form a third clamping block 116 that protrudes and extends to the clamping end 1142. When the first buckling portion 101 is connected to the rotation-connecting portion 103, the locking member 112 correspondingly passes through the accommodating end 1141 of the rotation-limiting hole 114, and the locking member 112 is correspondingly moved to the clamping end 1142 of the rotation-limiting hole 114 by rotating the first buckling portion 101 or the rotation-connecting portion 103. In this case, the locking member 112 and the third clamping block 116 are abutted and clamped to realize the connection between the first buckling portion 101 and the rotation-connecting portion 103.

Referring to FIG. 20 again, the first buckling portion 101 is further provided with a buckling member 117 in the diameter direction thereof, the buckling member 117 protrudes toward the side away from the rotation-connecting portion 103, and the diameter direction of the connecting line of the two buckling members 117 is perpendicular to the diameter direction of the connecting line of the clamping plate 115. The buckling member 117 has a resilient structure and has the same structure as the second clamping block 425 of the module unit 10, that is, the structure of the buckling member 117 corresponds to the structure of the first buckling block 424 of the module unit 10, and the side of the buckling member 117 close to the second connecting block 110 is recessed to form an arc-shaped recessed hole 119.

Figure 21:
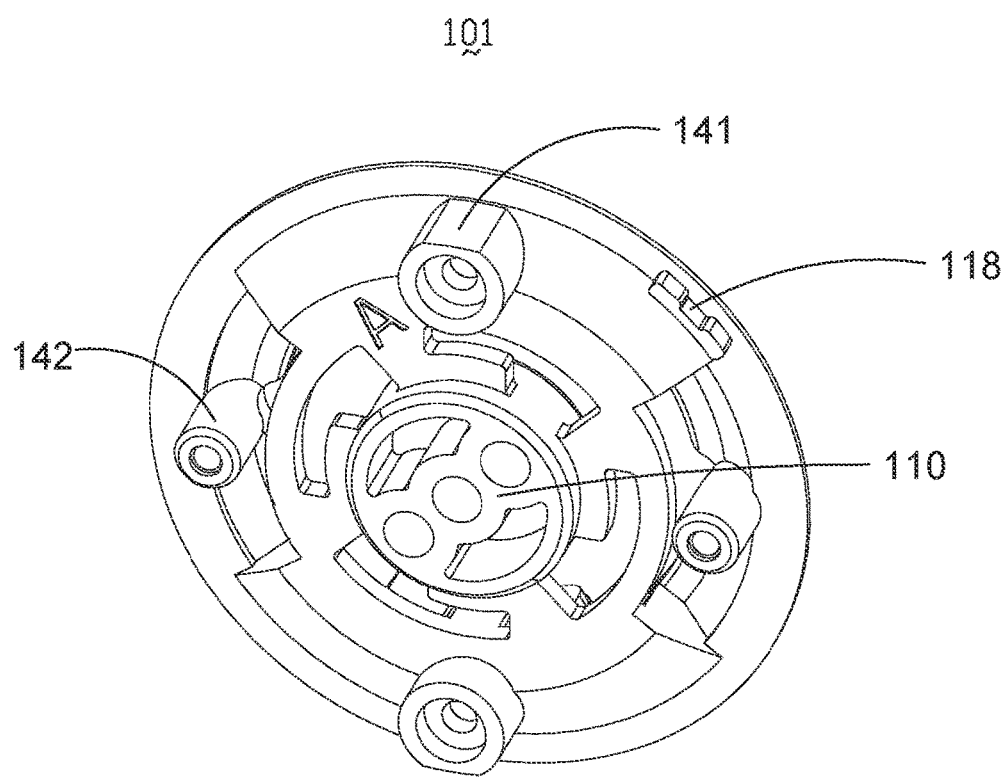
FIG. 21 is another perspective view of the first buckling portion according to the second embodiment of the present disclosure.

Referring to FIG. 21, the first buckling portion 101 is provided with a latching position 118 on the side facing the rotation-connecting portion 103, and the latching position 118 corresponds to the position-limiting protrusion 109. The latching position 118 slides on the latching slot 108 until abutting against the position-limiting protrusion 109 to realize the latching connection between the first buckling portion 101 and the rotation-connecting portion 103.

The first buckling portion 101 protrudes toward one side of the rotation-connecting portion 103 to form a first connecting shaft 141 and a second connecting shaft 142. The first connecting shaft 141 and the second connecting shaft 142 of the first buckling portion 101 are respectively connected to the second connecting shaft 142 and the first connecting shaft 141 of the second buckling portion 102 and are accommodated in the rotating hole 106 that plays a guiding role when the first buckling portion 101 and the second buckling portion 102 are connected and rotated.

When assembled to use, the first electrical-connecting member 111 passes through the second accommodating hole 107 and is clamped and connected to the first buckling portion 101 and the second buckling portion 102. The locking members 112 respectively pass through and are accommodated in the accommodating ends 1141 of the rotation-limiting hole 114 of the first buckling portion 101 and the second buckling portion 102. By rotating the rotation-connecting portion 103 or the first buckling portion 101 and the second buckling portion 102, the first buckling portion 101 and the second buckling portion 102 can rotate with respect to the rotation-connecting portion 103. At this time, the locking member 112 rotates and moves from the accommodating end 1141 to the clamping end 1142, and the locking member 112 abuts against the third clamping block 116 of the clamping plate 115. The latching position 118 slides on the latching slot 108 to abut the position-limiting protrusion 109 to form a locking structure between the rotation-connecting portion 103, the first buckling portion 101 and the second buckling portion 102.

The sequence of assembly and use described above can also be adjusted, that is, the first buckling portion 101 can be connected to the rotation-connecting portion 103 first, and then the second buckling portion 102 can be connected to the rotation-connecting portion 103. The locking members 112 of the first buckling portion 101 and the second buckling portion 102 are accommodated in the accommodating ends 1141, at this time, rotating the rotation-connecting portion 103 to make the locking member 112 rotate and move to the clamping end 1142, and the latching position 118 slides on the latching slot 108 until abutting against the position-limiting protrusion 109.

The design of the buckling assembly 100 is simple and convenient and can improve the stability of the buckling connection at a lower cost, so that the rigidity of the connection of the buckling assembly 100 is improved, a relative large external force can be withstood, and the way in which buckles are connected to each other before is not changed.

Figure 22:
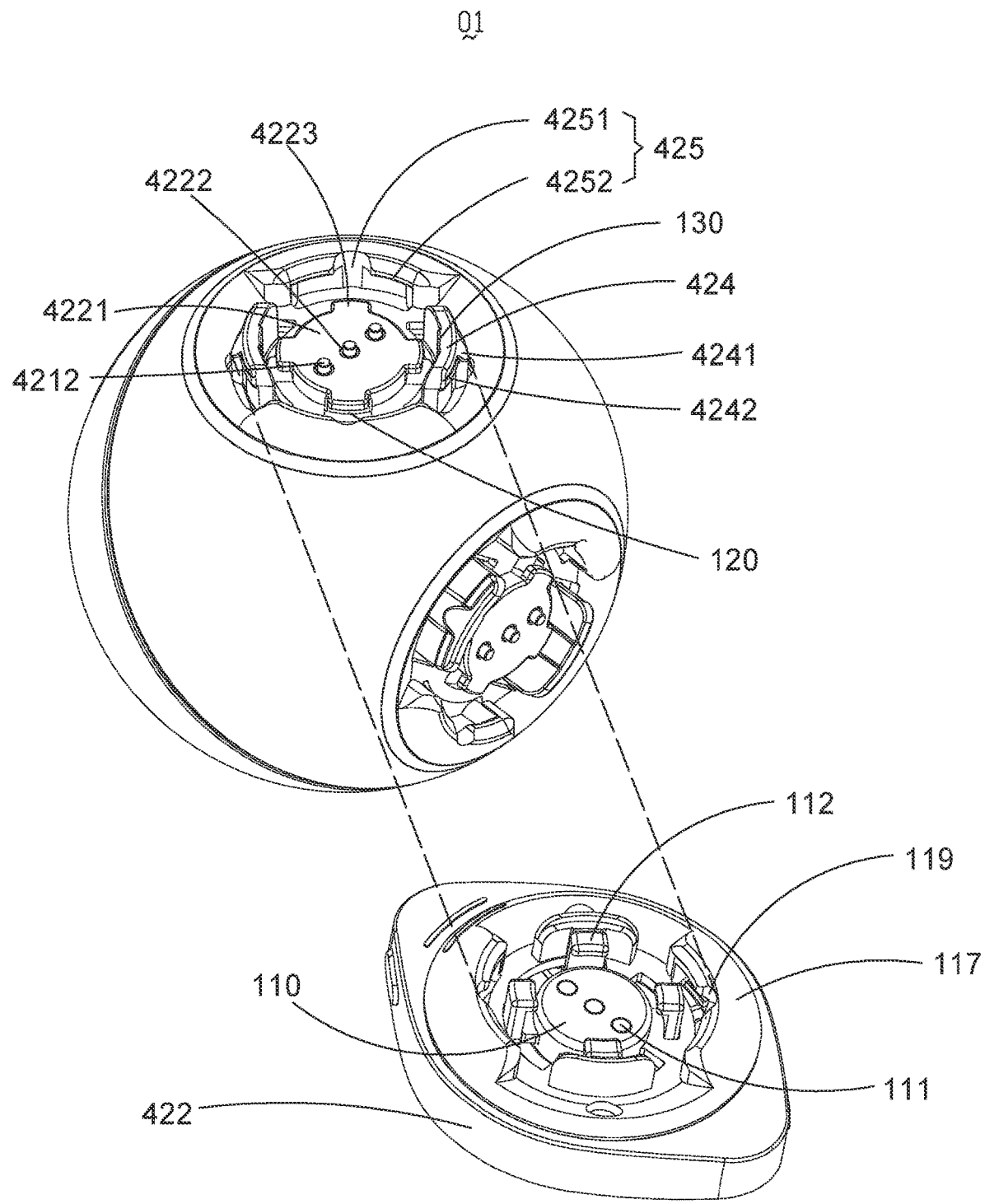
FIG. 22 is a perspective view of the connection between the module unit and the buckling assembly according to the second embodiment of the present disclosure.

Referring to FIG. 22, a buckle-fastening assembly (not labeled) is provided, which includes a surface buckle 42 and a buckling assembly 100 coupled with the surface buckle 42. A gap is left between the first protrusion 4223 of the surface buckle 42 and the buckle-connecting member 422 to form an accommodating space 120 for accommodating the locking member 112. The first buckling block 424 protrudes toward the first protrusion 4223 to form a clamping member 130 for resisting the locking member 112 to limit the movement of the locking member 112 and realize the coupling connection between the buckling assembly 100 and the module unit 10.

When the buckling assembly 100 is coupled with and connected to the module unit 10, the locking member 112 correspondingly extends into the first connecting block 4221, and the buckling assembly 100 and the module unit 10 are relatively rotated by rotating the locking member 112 and/or the buckling assembly 100. At this time, the locking member 112 rotates into the accommodating space 120 and the locking member 112 respectively resists the first protrusion 4223 and the clamping member 130, and the recessed hole 119 on the buckling member 117 is rotated until abutting against the connecting protrusion 4241, so that the connection between the buckling assembly 100 and the module unit 10 can be locked. At this time, the first connecting block 4221 is in contact with the second connecting block 110, and the second electrical-connecting member 4212 is in contact with the first electrical-connecting member 111 to realize signal transmission.

The present disclosure further provides a modular robot, which includes the above-mentioned at least two module units 10 spliced together, and includes the above-mentioned buckle-fastening assembly. For details, reference may be made to the aforementioned description of the buckle-fastening assembly, which will not be described here. The buckle-fastening assembly can be used to connect any two or more of the module units 10, wheels, robotic arms, or bases.

The present disclosure further provides a modular robot, which includes a plurality of functional assemblies and at least one above-mentioned buckle-fastening assembly, and the functional assembly includes at least one above-mentioned surface buckle 42. The buckle-fastening assembly includes the buckling assembly 100. The buckle-fastening assembly is used to connect any two of the functional assemblies, and the two functional assemblies are indirectly connected by the buckle-fastening assembly, that is, the indirect connection of the two functional assemblies is realized through the connection of the surface buckle 42 and the buckling assembly 100.

The modular robot 01 includes any one or a combination of a position servo system, a speed servo system, and a torque servo system.

Figure 23:
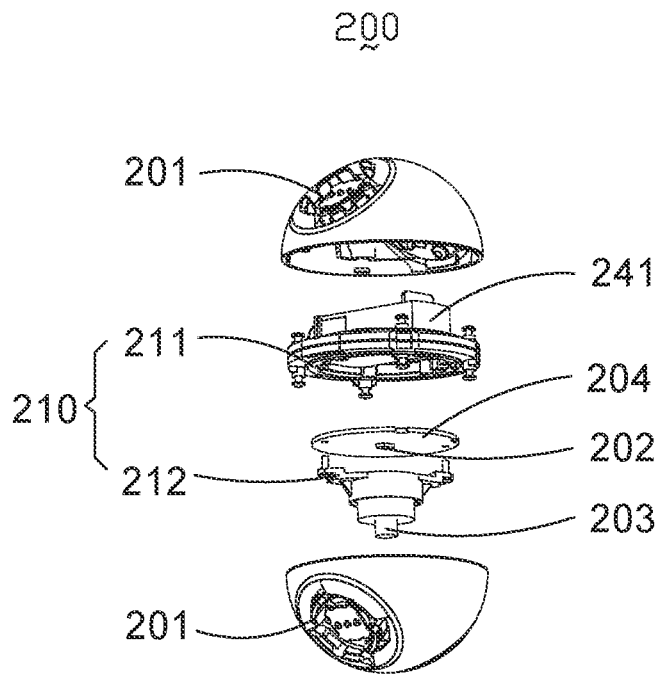
FIG. 23 is an exploded view of a module-unit-position servo system according to a third embodiment of the present disclosure.

Referring to FIG. 23, a third embodiment of the present disclosure provides a module-unit-position servo system 200. The module unit 10 in the first embodiment of the present disclosure includes the module-unit-position servo system 200 for detecting the position change between two rotating portions 201 in the module unit 10, and the two rotating portions 201 can be relatively rotated. The module-unit-position servo system 200 includes a position sensor 202 disposed in any one of the rotating portions 201 and a pair of movement pairs 210 that can rotate in the circumferential direction. The module-unit-position servo system 200 further includes a transmission assembly 211 and a connecting assembly 212 that connect the two rotating portions 201, and the movement pairs 210 is constituted by the transmission assembly 211 and the connecting assembly 212. The position sensor 202 senses the rotation-angle information between the movement pairs 210, and controls the rotation of the transmission assembly 211 according to the rotation-angle information in combination with a target-angle command.

The connecting assembly 212 further includes a magnet 203 corresponding to the position sensor 202. When the two rotating portions 201 rotate relative to each other, the magnet 203 can rotate relative to the position sensor 202. The rotation-angle information between the two rotating portions 201 is detected by detecting the rotation angle between the magnet 203 and the position sensor 202.

The connecting assembly 212 further includes a controller 204 electrically connected to the position sensor 202. The rotation-angle information detected by the position sensor 202 is transmitted to the controller 204, and the controller 204 transmits a corresponding control information to the transmission assembly 211.

The transmission assembly 211 includes a drive motor 241 disposed in any one of the rotating portions 201, and the controller 204 controls the rotation speed of the drive motor 241 based on the rotation-angle information detected by the position sensor 202 and a target-angle command.

Referring to FIG. 11 and FIG. 13, the transmission assembly 211 further includes at least two speed sensors 244 and a magnetic member 243 coaxially connected to the drive motor 241. The speed sensors 244 are disposed at opposite sides of the magnetic member 243 in the circumferential direction of the magnetic member 243, and the speed sensors 244 detect the change of the magnetic poles of the magnetic member 243 to calculate the rotation speed of the drive motor 241 and determine the forward and reverse rotation of the drive motor 241.

Figure 24:
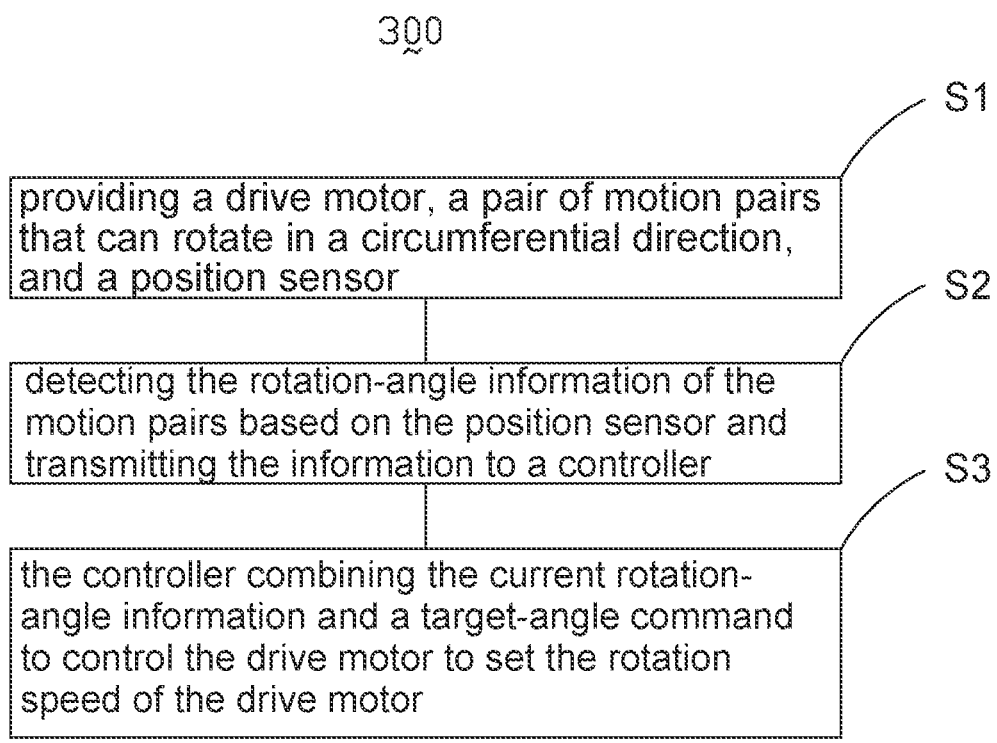
FIG. 24 is a flowchart of a control method of the module-unit-position servo system according to a fourth embodiment of the present disclosure.

Referring to FIG. 24, a fourth embodiment of the present disclosure provides a method 300 for controlling a module-unit-position servo system, which includes the steps of:

S1: providing a drive motor, a pair of motion pairs that can rotate in a circumferential direction, and a position sensor;

S2: detecting the rotation-angle information of the motion pairs based on the position sensor and transmitting the information to a controller;

S3: the controller combining the current rotation-angle information and a target-angle command to control the drive motor to set the rotation speed of the drive motor.

Compared with the prior art, the module-unit-position servo system and the control method therefor, and the modular robot of the present disclosure have the following beneficial effects.

The present disclosure provides a module-unit-position servo system for detecting the position change between two rotating portions in a module unit of a modular robot; the module unit includes a position sensor disposed in any of the rotating portions and a pair of circumferentially rotatable motion pairs for connecting the two rotating portions; the position sensor senses the rotation-angle information between the motion pairs and controls at least one of the rotating portions to rotate according to the rotation-angle information in combination with a target-angle command By sensing the rotation-angle information between the motion pairs by the position sensor arranged in any of the rotating portions, the angle (position) information between the two rotating portions can be obtained, so that the relative position thereof can be accurately controlled. In addition, the coupling of the position sensor and the motion pairs can reduce the volume of the module unit and make the design compact.

The motion pair includes a transmission assembly and a connecting assembly for connecting the two rotating portions, and the connecting assembly further includes a magnet corresponding to the position sensor; when the two rotating portions rotate, the magnet can rotate with respect to the position sensor, and the rotation-angle information of the two rotating portions is detected by detecting the rotation angle between the magnet and the position sensor; the connecting assembly further includes a controller, the rotation-angle information detected by the position sensor is transmitted to the controller, and the controller transmits corresponding control information to the transmission assembly. Thus, the operation is convenient and the measurement accuracy is high, and the control of the two rotating portions can be realized.

The transmission assembly includes a drive motor disposed in any of the rotating portions, and the controller controls the rotation speed of the drive motor based on a target-angle command and the rotation-angle information detected by the position sensor. Thus, the controller can control the rotation of the drive motor through the rotation angle-information, which is simple to operate and saves costs.

A bevel gear is provided on the other end of the drive motor away from the magnetic member, and the bevel gear is coaxially connected to the drive motor; the transmission assembly further includes a connecting plate and a gear ring, the ring surface of the gear ring without gears is connected to the connecting plate, and the ring surface of the gear ring with gears is rotatably connected to the bevel gear. The gear transmission has a large transmission ratio, which can be used for decrease or increase of speed, and the transmission efficiency thereof is high.

The connecting assembly further includes a second PCB board, the controller and the position sensor are both disposed on the second PCB board, and the side of the connecting plate away from the gear ring is connected to the second PCB board. Thus, the second PCB board integrates the position sensor and the controller, which can reduce the gears of the module unit and has a compact design.

A drive motor, a pair of circumferentially rotatable motion pairs and a position sensor are provided; the rotation-angle information of the motion pairs is detected and transmitted to a controller based on the position sensor; the controller combines the current rotation-angle information with a target-angle command to control the drive motor to set the rotation speed of the drive motor. Thus, the structure thereof is simple, and the rotation-angle information can be obtained through a simple process, and then the drive motor can be controlled to rotate.

A spherical module unit is provided, which includes two hemispherical rotating portions, and at least one buckle-connecting member is disposed on each of the rotating portions; the vertical line passing through the center of the buckle-connecting member and perpendicular to the plane on which the buckle-connecting member is positioned intersects with the rotating shaft of the rotating portion and the intersection angle thereof is 45 degree. Thus, no matter whether the rotating shafts of the two module units are parallel or vertical, the two module units can be spliced together, which reduces the coupling of the freedom degree between the mutually spliced module units.

The number of the buckle-connecting member is even, and the positions of the buckle-connecting members of the two rotating portions are mirror-symmetrical based on the interface of the two rotating portions. The buckle-connecting member is provided with a first contact, and signal communication and signal transmission between the module units can be realized by contacting the first contact with the corresponding contact of an external module.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A module-unit-position servo system for detecting the position change between two rotating portions in a module unit of a modular robot, wherein the module unit comprises a position sensor disposed in any of the rotating portions and a pair of circumferentially rotatable motion pairs for connecting the two rotating portions; the position sensor senses the rotation-angle information between the motion pairs and controls at least one of the rotating portions to rotate according to the rotation-angle information in combination with a target-angle command;

wherein the motion pair comprises a transmission assembly and a connecting assembly for connecting the two rotating portions, and the connecting assembly further comprises a magnet corresponding to the position sensor; when the two rotating portions rotate, the magnet can rotate with respect to the position sensor, and the rotation-angle information of the two rotating portions is detected by detecting the rotation angle between the magnet and the position sensor;

the connecting assembly further comprises a controller, the rotation-angle information detected by the position sensor is transmitted to the controller, and the controller transmits corresponding control information to the transmission assembly;

the transmission assembly comprises a drive motor disposed in any of the rotating portions, and the controller controls the rotation speed of the drive motor based on a target-angle command and the rotation-angle information detected by the position sensor; and the transmission assembly further comprises at least two speed sensors and a magnetic member coaxially connected to the drive motor, and the speed sensors are arranged at opposite sides of the magnetic member in the circumferential direction of the magnetic member; the speed sensor detects the change of magnetic poles of the magnetic member to calculate the rotation speed of the drive motor and determine the forward and reverse rotation of the drive motor.

2. The module-unit-position servo system according to claim 1, wherein a bevel gear is provided on the other end of the drive motor away from the magnetic member, and the bevel gear is coaxially connected to the drive motor; the transmission assembly further comprises a connecting plate and a gear ring, the ring surface of the gear ring without gears is connected to the connecting plate, and the ring surface of the gear ring with gears is rotatably connected to the bevel gear.

3. The module-unit-position servo system according to claim 2, wherein the connecting assembly further comprises a second PCB board, the controller and the position sensor are both disposed on the second PCB board, and the side of the connecting plate away from the gear ring is connected to the second PCB board.

4. The module-unit-position servo system according to claim 3, wherein the connecting assembly further comprises a slip ring sleeved on the peripheral side of the magnet, and the slip ring rotates synchronously with the position sensor; the second PCB board is further provided with a conductive ring seat, the slip ring is partially clamped in the conductive ring seat, and the conductive ring seat drives the slip ring to rotate with respect to the magnet.

5. A modular robot, comprising at least two spliceable module units; the module unit comprising a module-unit-position servo system for detecting the position change between two rotating portions in the module unit; the module-unit-position servo system comprising a position sensor disposed in any of the rotating portions and a pair of circumferentially rotatable motion pairs for connecting the two rotating portions; the position sensor sensing the rotation-angle information between the motion pairs and controlling at least one of the rotating portions to rotate according to the rotation-angle information in combination with a target-angle command;

wherein the two rotating portions are hemispherical, and at least one buckle-connecting member is disposed on each of the rotating portions; the vertical line passing through the center of the buckle-connecting member and perpendicular to the plane on which the buckle-connecting member is positioned intersects with the rotating shaft of the rotating portion, and the intersection angle thereof is 45 degree; and the number of the buckle-connecting member is even, and the positions of the buckle-connecting members of the two rotating portions are mirror-symmetrical based on the interface of the two rotating portions.

6. A control method for a module-unit-position servo system for detecting the position change between two rotating portions in a module unit, the module-unit-position servo system comprising a position sensor, a drive motor and a controller disposed in any of the rotating portions, and a pair of circumferentially rotatable motion pairs for connecting the two rotating portions; the control method comprising the steps of: the controller controlling the drive motor according to the current rotation-angle information in combination with a target-angle command, so as to set the rotation speed of the drive motor and control at least one of the rotating portions to rotate;

wherein the motion pair comprises a transmission assembly and a connecting assembly for connecting the two rotating portions, and the connecting assembly further comprises a magnet corresponding to the position sensor; when the two rotating portions rotate, the magnet can rotate with respect to the position sensor, and the rotation-angle information of the two rotating portions is detected by detecting the rotation angle between the magnet and the position sensor;

the connecting assembly further comprises a controller, the rotation-angle information detected by the position sensor is transmitted to the controller, and the controller transmits corresponding control information to the transmission assembly;

the transmission assembly comprises a drive motor disposed in any of the rotating portions, and the controller controls the rotation speed of the drive motor based on a target-angle command and the rotation-angle information detected by the position sensor; and the transmission assembly further comprises at least two speed sensors and a magnetic member coaxially connected to the drive motor, and the speed sensors are arranged at opposite sides of the magnetic member in the circumferential direction of the magnetic member; the speed sensor detects the change of magnetic poles of the magnetic member to calculate the rotation speed of the drive motor and determine the forward and reverse rotation of the drive motor.

* * * * *